US012234949B2

(12) United States Patent
Mary et al.

(10) Patent No.: US 12,234,949 B2
(45) Date of Patent: Feb. 25, 2025

(54) CONTAINER FOR PRESSURIZED FLUID WITH ELECTRONIC DEVICE FOR CALCULATING AND UPDATED DISPLAYING OF REMAINING FLUID

(71) Applicant: L'Air Liquide Société Anonyme pour l'Etude et l'Exploitation des Procédés George Claude, Paris (FR)

(72) Inventors: Alexis Mary, Boulogne-Billancourt (FR); Bertrand Morin, Alfortville (FR); Valerie Pateau, Antony (FR)

(73) Assignee: L'Air Liquide, Societe Anonyme Pour l'Etude et l'Exploitation des Procedes, Georges Claude Paris (FR)

( * ) Notice: Subject to any disclaimer, the term of this patent is extended or adjusted under 35 U.S.C. 154(b) by 353 days.

(21) Appl. No.: 17/689,647

(22) Filed: Mar. 8, 2022

(65) Prior Publication Data

US 2022/0299169 A1 Sep. 22, 2022

(30) Foreign Application Priority Data

Mar. 8, 2021 (FR) ...................................... 2102188

(51) Int. Cl.
F17C 13/02 (2006.01)
F17C 1/00 (2006.01)
(Continued)

(52) U.S. Cl.
CPC ............. *F17C 13/025* (2013.01); *F17C 1/00* (2013.01); *F17C 13/026* (2013.01); *F17C 13/04* (2013.01);
(Continued)

(58) Field of Classification Search
CPC ...... F17C 13/025; F17C 13/026; F17C 13/04; F17C 1/00; G01F 1/86; G01F 22/02
(Continued)

(56) References Cited

U.S. PATENT DOCUMENTS 10,151,405 B1 12/2018 Tebebi et al.
2015/0260343 A1 9/2015 Baune et al.
(Continued)

FOREIGN PATENT DOCUMENTS

EP 2918892 2/2015
FR 3 016 679 7/2015
(Continued)

OTHER PUBLICATIONS

EP Search Report, Jun. 14, 2022. (Year: 2022).*
French Search Report for corresponding FR 2102188, Nov. 1, 2021.

*Primary Examiner* — Michael P Nghiem
(74) *Attorney, Agent, or Firm* — Elwood L. Haynes (57) ABSTRACT

A container for pressurized fluid, in particular a gas cylinder, having a given internal volume, having a fluid distribution valve having a member for selecting the flow rate, which can be manipulated by a user, a position sensor configured to detect the position of the member for adjusting flow rate, and an electronic device having a means for measuring pressure and temperature, a microprocessor-based data processing means that are configured to calculate a remaining fluid on the basis of pressure and temperature measurements, of the position of the member for selecting the flow rate and of the internal volume of the container, a timer, and display means for displaying an updated remaining fluid.

12 Claims, 3 Drawing Sheets

(51) Int. Cl.
*F17C 13/04* (2006.01)
*G01F 1/86* (2006.01)
*G01F 13/00* (2006.01)
*G01F 22/02* (2006.01)

(52) U.S. Cl.
CPC .............. *G01F 1/86* (2013.01); *G01F 13/006* (2013.01); *G01F 22/02* (2013.01); *F17C 2201/0119* (2013.01); *F17C 2201/032* (2013.01); *F17C 2205/0326* (2013.01); *F17C 2205/0394* (2013.01); *F17C 2221/011* (2013.01); *F17C 2223/0123* (2013.01); *F17C 2250/043* (2013.01); *F17C 2250/0439* (2013.01); *F17C 2250/0491* (2013.01); *F17C 2250/0495* (2013.01); *F17C 2250/0694* (2013.01); *F17C 2270/025* (2013.01)

(58) Field of Classification Search
USPC .......................................................... 702/55
See application file for complete search history.

(56) References Cited

U.S. PATENT DOCUMENTS

| | | |
|---|---|---|
| 2016/0282165 A1 | 9/2016 | Allen |
| 2016/0377471 A1 | 12/2016 | Wise |
| 2017/0002981 A1 | 1/2017 | Carron et al. |
| 2019/0186696 A1 | 6/2019 | Ferre et al. |
| 2021/0278047 A1* | 9/2021 | Andre Dias ............ F17C 13/02 |

FOREIGN PATENT DOCUMENTS

| | | |
|---|---|---|
| FR | 3 075 310 | 6/2019 |
| WO | WO 2005 093377 | 9/2005 |

* cited by examiner

CONTAINER FOR PRESSURIZED FLUID WITH ELECTRONIC DEVICE FOR CALCULATING AND UPDATED DISPLAYING OF REMAINING FLUID

CROSS REFERENCE TO RELATED APPLICATIONS

This application claims the benefit of priority under 35 U.S.C. § 119 (a) and (b) to French Patent Application No. 2102188, filed Mar. 8, 2021, the entire contents of which are incorporated herein by reference.

BACKGROUND

The invention relates to a container for pressurized fluid (e.g. gas), in particular a gas cylinder, equipped with a fluid distribution valve comprising an electronic device for calculating the remaining fluid and displaying it such that it is updated over time as the fluid container is used, and to the use thereof to store and/or supply a pressurized fluid, in particular a medical gas, such as oxygen or another gas or gas mixture.

Medical fluids or gases, such as oxygen, $NO/N_2$, $N_2O/O_2$, $He/O_2$ mixtures, medical air, etc., are generally contained in pressurized gas containers, such as gas cylinders or tanks, which are equipped with a distribution valve, which might or might not have an integrated pressure-regulating (IPR) system, and which has a member for selecting the flow rate, for example a rotary handwheel, used to supply the medical gas at a flow rate selected by the user, and with a dial-type manometer or with an electronic device with a digital display for displaying the remaining gas pressure or a remaining gas. Thus, EP-A-2918892 proposes a gas cylinder equipped with an IPR and with an electronic device with a digital display screen.

The electronic device comprises one or more pressure and temperature sensors which transmit their measurements to a microprocessor which in turn cooperates with a display screen in order to process the measurements and calculate and then display in particular the remaining gas volume, the gas pressure and especially the remaining gas available, generally expressed in hours and minutes, in particular according to the gas flow rate selected via the member for selecting the flow rate and delivered by the distribution valve.

One example of a container for pressurized gas equipped with a fluid distribution valve and with an electronic device is given by FR 3016679.

It is essential to be able to display an exact remainder, in particular when the gas is a medical gas that is being administered to a patient, for example oxygen, so that the patient is not left without gas, due to an erroneous remainder, i.e. one that has been overestimated and is therefore overly optimistic.

To determine the available remainder, a pressure sensor is used to take successive pressure measurements which are used to calculate a variation in pressure over a given duration and to deduce the remainder therefrom. However, such a calculation cannot be instantaneous because it has to be based on a sufficient number of pressure values measured over time. A remainder can therefore be displayed only after a duration of use of several minutes, typically 2 to 10 minutes, also called the "delay time". However, it is understood that this is not satisfactory when a caregiver immediately wishes to know the remaining gas in a gas cylinder that they have are starting to use to treat a patient.

To remedy this, it has been proposed to determine the available remainder in the initial phase or "delay time", i.e. typically for the first 2 to 10 minutes of use of the fluid container, on the basis of the position of the member for selecting the flow rate, of the measured values of the pressure and of the temperature of the fluid, and of the known volume of the fluid container. This avoids the user having to wait several minutes before knowing the available remainder.

Nevertheless, it has been observed that the display of the available remainder, typically a duration expressed in one or more hours and minutes, is relatively inaccurate and/or fluctuates, i.e. regularly increases or decreases as the fluid container is used.

To minimize these fluctuations, the microprocessor of the electronic device is often configured to decrease the remainder over long, or very long, periods of time, for example every 10 minutes, every 30 minutes, or even every hour. However, while this prevents large fluctuations in the displayed remainder, it results in the provision of a remainder that exhibits a certain degree of uncertainty and therefore leads to a low level of confidence for the user.

Nowadays, a user expects to see the remainder be updated over much shorter periods, typically decreasing minute by minute for example, and without large fluctuations.

However, a number of effects increase the difficulty in exhibiting a remainder that decreases minute by minute, namely in particular the imprecision of the pressure sensor (e.g. variations of 100 mbar between two pressure measurements), temperature effects (e.g. pressure change in the gas which cools during use thereof), restrictions on power consumption to save the battery (i.e. limiting the number of samples and the computing time), the reactiveness for the display desired by the user (i.e. displaying the remainder in less than 1 sec), the use of low flow rates (i.e. a few L/min leading to a small drop in pressure which is comparable with the imprecision of the sensor), high-pressure filling of the gas cylinder, etc.

In other words, the display of the remainder on the electronic device fitted to the fluid distribution valve of a container for pressurized fluid, typically a gas cylinder, is often relatively unreliable because the remainder may fluctuate more or less substantially over time, i.e. when updating the displaying of the remainder, which may lead to use safety issues, in particular when used in the health sector.

One problem is therefore to be able to provide the user with the available remainder in a container for pressurized fluid, typically a gas cylinder, equipped with a fluid distribution valve equipped with a microprocessor-based electronic device which fluctuates less and is therefore more reliable for the user.

SUMMARY

One solution of the invention thus relates to a container for pressurized fluid (e.g. gas), in particular a gas cylinder, having a given internal volume, i.e. of known and stored volume, comprising a fluid distribution valve comprising:
- a member for selecting the flow rate, which can be manipulated by a user between a plurality of distinct positions, each corresponding to a given fluid flow rate,
- at least one position sensor configured to detect the position of the member for selecting the flow rate,
- and an electronic device comprising:
  - means for measuring pressure and temperature in order to measure the pressure and the temperature of the fluid contained in the fluid container, data processing means comprising at least one microprocessor which are configured to calculate a remaining fluid on the basis of all or some of the pressure and/or temperature measurements, of the position of the member for selecting the flow rate and of the internal volume of the container, a timer, and display means for displaying the remaining fluid calculated by the data processing means.

According to the invention, the data processing means are configured to:

A) for an initial delay phase shorter than 10 minutes, starting when the member for selecting the flow rate is manipulated by the user in order to move it from a first position corresponding to a first fluid flow rate to a second position corresponding to a second fluid flow rate:
  i) calculate a remaining fluid on the basis of the position of the member for selecting the flow rate, of the measurements of the pressure and temperature of the gas, and of the internal volume of the fluid container,
  ii) control displaying of the remainder (Ac) calculated in step A) i) on the display means, and
  iii) update, after a period of 1 minute, the displaying of the displayed remainder by controlling displaying, on the display means, of an updated remainder equal to the displayed remainder minus a duration of 1 minute, and B) repeat step A) iii) throughout the initial delay phase, to display an updated remainder (Ar) after a time interval of between 30 seconds and 5 minutes throughout said initial delay phase.

Depending on the embodiment in question, the gas container according to the invention, typically a gas cylinder, may comprise one or more of the following features:

in step B), the time interval is preferably between 30 seconds and 4 minutes, more preferably between 30 seconds and 3 minutes.

in step B), the updated remainder (Ar) is updated and displayed at time intervals of the order of 1 minute, i.e. every minute.

it comprises storage means for storing at least one history comprising the pressure and temperature measurements taken by the means for measuring pressure and temperature.

the data processing means are further configured to:

C) calculate, after the initial delay phase, at least one remainder (Ac) calculated on the basis of the history of the stored measurements of the pressure and temperature of the gas, and of the internal volume of the fluid container.

the data processing means are further configured to:

D) compare the calculated remainder (Ac) with the updated remainder (Ar) displayed on the display means in step B) and E) control displaying, on the display means, of:
  i) the updated remainder (Ar) when: $0.9.Ar \leq Ac \leq 1.1.Ar$, or
  ii) the calculated remainder (Ac) when: $Ac<0.9.Ar$ or $Ac>1.1.Ar$.

the data processing means are further configured to repeat steps C), D) and E) so as to update the displaying of the remainder after an updating period of between 30 seconds and 3 minutes.

the data processing means are further configured to set the duration of the updating period according to the difference between the calculated remainder (Ac) and the updated remainder (Ar).

the duration de the updating period is of the order of 1 minute when, in step E) ii), the calculated remainder (Ac) is displayed on the display means.

the data processing means are configured to display the calculated remainder (Ac) when said data processing means determine, in step D), that the calculated remainder (Ac) and the updated remainder (Ar) differ from one another by at least 10 minutes, preferably by at least 15 minutes.

according to one embodiment, the data processing means are configured to always display the calculated remainder (Ac) when the remainder is smaller than or equal to a preset safety threshold, preferably a safety threshold shorter than or equal to 30 minutes.

according to another embodiment, the data processing means are configured to display the calculated remainder (Ac) when the remainder is smaller than or equal to the updated remainder (Ar).

the timer is integrated into the data processing means, in particular driven by a microprocessor.

the data processing means comprise one or more microprocessors.

the member for selecting the flow rate is configured to adopt a plurality of distinct positions each corresponding to a given fluid flow rate between 0 and 30 L/min, said member for selecting the flow rate being able to be rotatably manipulated (clockwise or anticlockwise) by a user in order to select the desired flow rate.

the selectable positions are angularly offset positions.

the delay phase has a non-zero duration shorter than 7 minutes, typically of the order of 3 to 6 minutes.

the given volume of the fluid container is stored by the data processing means, in particular by the microprocessor or storage means.

the given volume of the fluid container is between 1 and 20 L, preferably between 2 and 15 L (water equivalent).

the member for selecting the flow rate comprises a rotary member, preferably a rotary handwheel or the like.

the means for measuring pressure and temperature comprise a single pressure and temperature sensor configured to take measurements both of the pressure and of the temperature of the fluid.

alternatively, the means for measuring pressure and temperature comprise a pressure sensor and a temperature sensor that are distinct from one another.

the one or more pressure and temperature sensors are in fluidic communication with an internal gas circuit of the fluid distribution valve so as to take the pressure and temperature measurements there.

the one or more sensors are electrically connected to the data processing means in order to provide measurements (i.e. signals) of the pressure and of the temperature of the fluid to said data processing means.

the one or more sensors are configured to measure temperatures of between −40° C. and +70° C.

the single pressure and temperature sensor comprises a sensor body through which an internal passage passes allowing the pressure and the temperature to be measured, i.e. constituting a single tap for taking the pressure and the temperature.

the data processing means comprise one or more microprocessors implementing one or more algorithms.

the one or more microprocessors are configured to process the one or more pressure and temperature measurements provided by the single pressure and temperature sensor.

the data processing means comprise a circuit board.

the data processing means comprise at least one microcontroller. More precisely, one or more microprocessors are integrated in the form of a microcontroller.

said at least one microprocessor is arranged on a circuit board.

the one or more microprocessors, in particular the one or more microcontrollers, are configured to save data, in particular within software or a dedicated algorithm.

the internal gas passage of the gas distribution valve within which the pressure and temperature measurements are taken is in fluidic communication with the internal volume of the gas container.

the internal gas circuit of the fluid distribution valve is in fluidic communication with the internal volume of the fluid container used to store the pressurized fluid.

the data processing means and the display means are supplied with electric current by an electric current source.

the one or more sensors are supplied with electric current by an electric current source.

the single pressure and temperature sensor comprises embedded electronics allowing the pressure and the temperature of the gas to be determined.

the single pressure and temperature sensor comprises embedded electronics comprising membrane-based means for determining the pressure of the gas and temperature probe-based means for measuring the temperature of the gas.

the membrane-based means and the temperature probe-based means are arranged so as to be in contact with the gas conveyed by the internal passage in the sensor body, i.e. a single same gas duct.

the embedded electronics of the single pressure and temperature sensor are electrically connected to the data processing means in order to communicate signals and/or measured pressure and temperature values thereto.

the embedded electronics of the single pressure and temperature sensor comprise one or more additional microprocessors.

the electronic device is a digital manometer configured to control displaying of the pressure of the fluid, of the volume of the fluid in the container and/or of the flow rate of the gas delivered by the valve and also the remaining gas, i.e. duration of use with respect to the amount of fluid remaining in the container and/or to the flow rate at which the gas is delivered by the valve.

the electric current source comprises one or more electric batteries or cells, which may or may not be rechargeable.

the display means of the electronic device comprise a digital display, i.e. such as an information display screen, for example of LCD type.

the fluid distribution valve comprises a delivery outlet connector for delivering the fluid, typically a gas, at the desired flow rate.

the fluid distribution valve comprises a fluid inlet orifice in fluidic communication with the internal gas circuit of the fluid distribution valve so as to allow pressurized fluid into the internal gas circuit of the fluid distribution valve.

the fluid inlet orifice of the fluid distribution valve is in fluidic communication with the internal volume of the fluid container.

the internal gas circuit of the fluid distribution valve fluidically connects the fluid inlet orifice to the delivery outlet connector.

the fluid distribution valve comprises a threaded attachment end fitting (i.e. an expansion) which is frusto-conical or cylindrical in shape.

the threaded attachment end fitting bears the fluid inlet orifice.

the gas cylinder comprises a neck bearing a fluid outlet orifice in fluidic communication with the interior of the gas cylinder, i.e. with its internal volume.

the fluid outlet orifice of the gas cylinder is tapped.

the threaded attachment end fitting of the fluid distribution valve is screwed into the tapped neck of the gas cylinder.

the internal gas circuit of the fluid distribution valve is made in, for example drilled into, the body of the fluid distribution valve.

the delivery outlet connector of the fluid distribution valve is configured to be fluidically connected to a flexible gas duct or another device using the fluid, such as a medical device or apparatus.

the data processing means are arranged in a rigid housing for the electronic device.

the device for selecting the flow rate comprises markings corresponding to the selectable desired gas flow rates.

the device for selecting the flow rate further cooperates with a device for adjusting the flow rate arranged in the body of the valve in order to adjust the flow rate to the desired gas flow rate value.

the device for adjusting the flow rate comprises a calibrated disc with orifices arranged in the path of the gas in the body of the valve.

the gas outlet connector is arranged at the centre of the rotary handwheel, i.e. they are arranged coaxially with one another.

the digital display of the electronic device is configured to display information, in particular the remaining gas, a gas pressure, a gas volume or an alert icon, for example a remainder alert or pipe restriction alert, etc.

it further comprises data storage means.

the data storage means comprise a read-only memory, preferably an EEPROM or the like.

the data storage means are arranged on a circuit board, preferably on the circuit board bearing the microprocessor.

the electronic device is attached to the body of the gas distribution valve, in particular by screwing or using a pin-based system.

the electrical power source supplies power to the circuit board, the one or more microprocessors, and all of the components operating with electric current, such as the digital display, the pressure and temperature sensor and/or an alert LED.

the fluid distribution valve is protected by a protective covering comprising a rigid covering body arranged around said fluid distribution valve.

- the electric current source is arranged in a compartment in the protective covering.
- the housing for the electronic device comprising the digital display is accommodated in an opening made in the covering body.
- the covering body defines an internal volume dimensioned to accommodate the gas distribution valve.
- the covering body is made of a polymer material, of metal or of combinations thereof.
- the covering body comprises one or more carrying handles; preferably the carrying handle is arranged so as to surmount the covering, i.e. it is located substantially on top of the covering.
- the gas distribution valve is a valve with an integrated pressure regulator or IPR.
- gas pressure regulation means are arranged on the internal gas circuit.
- the gas pressure regulation means comprise a pressure-regulating valve and a valve seat. They allow the pressure of the gas to be reduced from the high pressure of the gas stored in the container, typically several tens to hundreds of bar, down to a lower, preset pressure of use, typically a few bar, for example from 2 to 5 bar abs.
- the fluid distribution valve is made of copper alloy, such as brass.
- the covering body further comprises a securing system designed to allow it to be secured to a support, in particular to a bar of a hospital bed or to a stretcher for carrying a patient or the like.
- the covering body further comprises a movable, preferably pivoting, securing system.
- the fluid container, when full, contains a gas at a pressure of at least 130 to 200 bar abs, or even at least 300 bar abs.
- the fluid container has a cylindrical, in particular ogival, general shape, made of metal or metal alloy (e.g. steel, aluminium, etc.) or of one or more composite materials.
- the fluid container contains a gas or a mixture of gases, such as oxygen, an $NO/N_2$, $O_2/N_2O$ or $He/O_2$ mixture, air, or another medical gas.

The invention also relates to the use of a gas container according to the invention to store or to supply a pressurized gas, in particular a medical gas chosen from among oxygen or a gaseous mixture of $N_2O/O_2$, $NO/N_2$, $He/O_2$, or medical air.

BRIEF DESCRIPTION OF THE DRAWINGS

The invention will now be better understood from the following detailed description, which is given by way of a non-limiting illustration, with reference to the appended figures, in which.

DESCRIPTION OF PREFERRED EMBODIMENTS

Figure 1:
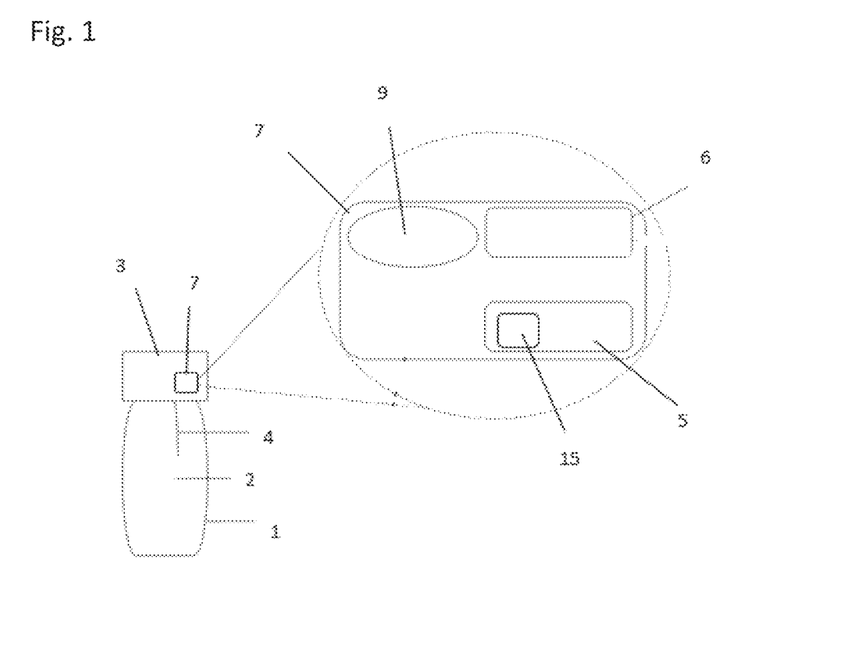
FIG. 1 is a schematic representation of a fluid container equipped with a gas distribution valve having an electronic device according to the invention.
Figure 2:
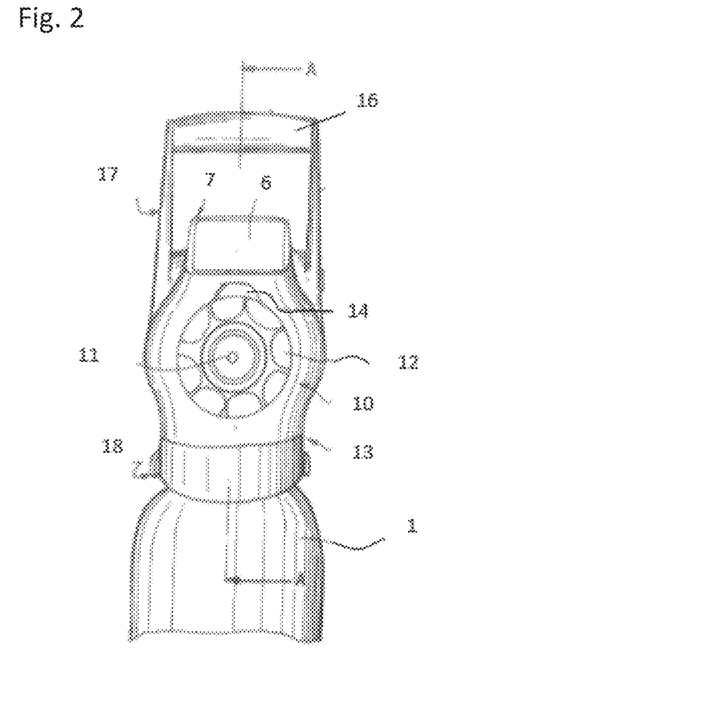
FIG. 2 shows one embodiment of a container of gas cylinder type for pressurized fluid according to the invention.

FIG. 1 is a schematic representation of a container 1 for pressurized gas according to the invention, while FIG. 2 shows one embodiment of such a container 1, namely here a pressurized gas cylinder. Such a gas container 1 is particularly well suited for storing or for supplying a medical gas (i.e. pure gas or gaseous mixture) chosen from among oxygen or a gaseous mixture such as $N_2O/O_2$, $NO/N_2$, $He/O_2$, or medical air.

Plus precisely, the fluid container 1 illustrated in FIG. 1 and FIG. 2 comprises an internal volume 2 for storing pressurized gas, for example at more than 200 bar abs (pressure when full), and is equipped with a fluid distribution valve 3, such as an IPR, through which passes an internal fluid passage or circuit (not shown) in fluidic communication with the internal volume 2 of the container 1 so as to convey the fluid, namely here gas, such as oxygen, within the body of the gas distribution valve 3 to a delivery outlet connector 11 to which is fluidically connected, for example, a flexible gas duct (not shown) or another device using the gas that is delivered.

The cylinder or container 1 for pressurized gas of axis AA in FIG. 2 comprises a cylindrical body and a neck, i.e. it is ogival in shape. The cylindrical body defines the internal volume 2 for storing gas under pressure, typically a maximum pressure of 130 to 300 bar abs, or even beyond 300 bar abs. The neck comprises a fluid inlet/outlet orifice that is in communication with the internal volume 2 and allows the gas to be withdrawn from the internal volume 2 or, conversely, allows it to be filled when it is empty. The gas distribution valve 3 is mounted, typically screwed, at the level of the orifice in the neck of the gas cylinder.

The container 1 has a cylindrical general shape and is made of metal or metal alloy (e.g. steel, aluminium, etc.) or of one or more composite materials. It contains a gas or a mixture of gases, such as oxygen, an $NO/N_2$, $O_2/N_2O$ or $He/O_2$ mixture, air, or any other medical gas.

The gas distribution valve 3, which is here an IPR including internal regulation means, is screwed, via an expansion or a threaded attachment end fitting, at the level of the neck of the gas cylinder, i.e. it is screwed into the fluid inlet/outlet orifice which bears complementary tapping.

The gas distribution valve 3 additionally comprises a gas distribution connector or end fitting, called the delivery outlet connector 11, to which can be connected, for example, a flexible gas duct, such as a pipe made of flexible plastic, used to convey the gas to a medical device or apparatus using the gas delivered by the valve 3, for example a breathing mask delivering gas to a patient at a flow rate prescribed by a doctor or the like corresponding to a treatment to be followed. The valve body is preferably made of brass or of stainless steel.

Additionally, the gas distribution valve 3 comprises either a distinct pressure sensor and a distinct temperature sensor, or a single pressure and temperature sensor 4 (as illustrated here), used to measure the pressure and the temperature of the gas within the internal gas passage and/or in the internal volume 2 of the container 1, and to delivery pressure measurements (i.e. measurement signals) to microprocessor 15-based data processing means 5, i.e. a data processing unit or device comprising one or more microprocessors 15 implementing one or more algorithms, for example a circuit board bearing one or more microprocessors 15 implementing one or more algorithms, etc., preferably a microcontroller. The data processing means 5 are also called driver means, control electronics or the like. Preferably, a single pressure and temperature sensor 4 is used since this simplifies the general architecture, in particular by decreasing the number of taps/bores required to take the measurements.

When a single pressure and temperature sensor 4 is used, it can comprise a sensor body through which passes an internal passage, for example an axial passage, i.e. a single duct or tap. The internal passage of the sensor is fluidically connected to the internal gas circuit of the fluid distribution valve 3 so that some of the pressurized gas conveyed by the internal gas circuit through the body of the distribution valve 3 will fill this internal passage of the sensor so as to allow the desired pressure and temperature measurements to be taken. For this, it is possible to use membrane-based means and temperature probe-based means which are connected to embedded electronics in the single pressure and temperature sensor 4. For example, a membrane may be provided in contact with the gas conveyed by the internal passage in order to measure the pressure of the gas and a temperature probe may be arranged, for example behind the membrane, in order to measure the temperature of the gas routed by the internal passage. The pressure and temperature measurements are processed by the embedded electronics, for example an internal circuit board with a microprocessor, and are then sent to the data processing means 5 comprising the microprocessor 15 in order to be used to determine the remaining gas.

Additionally, the microprocessor 15-based data processing means 5 are configured to process the pressure and temperature measurements provided by the one or more pressure and temperature sensors. They are preferably arranged in the housing for the electronic device 7, for example a digital manometer, attached to the fluid distribution valve 3, which comprises a digital display 6, such as an LCD screen or the like, for displaying the remainder or other parameters.

Provision is further made for a device for selecting the flow rate 12 which can be actuated by a user, such as a rotary handwheel, used to select a desired flow rate for the gas that has to be delivered by the delivery outlet connector 11, for example to meet what has been prescribed by a doctor or the like. As illustrated in FIG. 2, the device for selecting the flow rate 12 may be a rotary handwheel that can be rotated between a plurality of angular positions, offset from one another, which each correspond to a given flow rate value, namely typically selectable gas flow rate values of between 0 L/min and 30 L/min, preferably between 0 and 25 L/min.

For example, the selectable flow rate values may be as follows: 0, 0.5, 1, 2, 3, 5, 8, 10, 12, 15, 20, 22 and 25 L/min, or any other value. The desired flow rate value selected by the user by actuating the device for selecting the flow rate 12, i.e. rotary handwheel, appears in a readout window 14 located above the device for selecting the flow rate 12, for example a cutout made in the body 10 of the protective covering 13 arranged around the valve 3 and serving to protect it from impacts or other external stresses.

The device for selecting the flow rate 12 further cooperates with a device for adjusting the flow rate arranged in the body of the valve 3 in order to adjust the flow rate to the desired gas flow rate value, for example the device for adjusting the flow rate may be a calibrated disc with orifices arranged in the path of the gas in the body of the valve 3. Such an arrangement is known per se. Once the desired gas flow rate has been selected, the position of the device for selecting the flow rate 12, for example the angular position of the rotary handwheel, may be determined by virtue of one or more position sensors. Knowing the angular position of the rotary handwheel then allows the data processing means 5 to know the value of the desired gas flow rate that has been selected.

In the embodiment of FIG. 2, the delivery outlet connector 11 is arranged at the centre of and coaxially with the rotary handwheel for selecting the flow rate 12; however, they could also be separate from one another according other possible embodiments (not shown).

Additionally, the one or more pressure and temperature sensors 4 are configured and arranged to measure the pressure and the temperature of the gas in the cylinder 1, i.e. coming from the internal volume 2, and then to deliver the pressure and/or temperature measurements taken to the data processing means 5. The pressure and temperature measurements taken and transmitted by the one or more sensors 4 are, for example, signals that represent either pressure and/or temperature values or other quantities, such as voltage or current values, corresponding to pressure and/or temperature values. These pressure and/or temperature measurements are processed by the data processing means 5 in order to determine various items of information, namely the remainder, or even additionally the volume of gas in the container 1 or the gas pressure in the container 1. This information can be displayed on the display 6 for a user, typically a caregiver, such as a doctor or a nurse.

Provision is also made for a timer, for example internal to the data processing means 5, in order to allow duration calculations or other time tracking to be carried out, as explained hereinafter.

The internal volume 2 of the container 1 (in water equivalent) is a known value which can be stored by storage means 9 either directly in software implemented by the microprocessor 15 or in a computer memory, of EEPROM type or the like, of the electronic device 7. The computer memory can be arranged on the circuit board bearing the microprocessor 15 and electrically connected thereto. For example, gas cylinders equipped in this way used to deliver medical oxygen (i.e. oxygen of medical quality) typically have internal volumes 2 of between 1 L and 20 L (water equiv.), typically between 2 L and 15 L; for example, depending on the cylinder in question, the volume may be of the order of 2 L, 3.5 L, 4.6 L, 5 L, 7 L, 10 L, 11 L or 15 L.

The storage means 9 may also store other data, such as, for example, the duration elapsed between successive times, pressure and/or temperature measurements, or other parameters, such as the internal volume of the cylinder, the position of the selector, the configuration of the cylinder, the fill pressure, alerts, etc.

More generally, the electronic device 7, for example a digital manometer, which comprises the microprocessor 15-based data processing means 5, such as a circuit board, is accommodated in an opening or compartment provided in the body 10 of the protective covering 13 arranged around the fluid distribution valve 3 and serving to protect it from impacts or other possible damage, for example a rigid covering made of polymer and/or of metal, as illustrated in FIG. 2.

The body 10 of the covering 13 defines a volume or compartment dimensioned to accommodate the gas distribution valve, namely here a valve with an integrated pressure regulator or IPR. It additionally comprises one or more carrying handles 16 arranged here so as to surmount the covering 13, i.e. located substantially on top of the body 10 of the covering 13, and being connected to the body 10 here by two support uprights 17 projecting substantially upwards.

According to one embodiment, the covering body 10 may further comprise a securing system 18 (not completely visible), preferably a pivoting securing means, designed to allow it to be secured to a support, in particular to a bar of a hospital bed or to a stretcher for carrying a patient or the like.

The digital display 6 of the electronic device 7 comprises a digital screen, for example a liquid crystal display (LCD) or the like, borne by the rigid housing, in particular the front face, for the electronic device 7, as illustrated in FIG. 2. It may be displayed in colour or in black and white.

The digital display 6 is supplied with power by an electrical energy source (not visible) arranged in the covering 13, for example one or more batteries or cells placed in a cell compartment made in the wall of the covering body and closed by a removable flap or the like. The electrical power source also serves to supply power to the other components of the electronic device 7 that need electric current to operate, in particular the microprocessor 15-based data processing means 5.

As explained above, the digital display 6 of the electronic device 7 makes it possible to display all of the information of use to the user, such as, for example, pressure and gas volume values, a remainder (in hours and minutes) or other information or data, for example the value of the desired or actual gas flow rate (in L/min or in other units), or the remaining gas (in hours and minutes) may also be represented by a graphic bar. For example, the digital display 6 comprises a screen with a height of, for example, between 29 and 37 mm approximately, and with a width of, for example, between 39 and 43 mm approximately.

The microprocessor 15-based data processing means 5, typically a circuit board, are also configured to control sound alert means and/or visual alert means, preferably both, so as to trigger at least one sound alert and/or visual alert, preferably both, in the event of detection of a malfunction, in particular a restriction, or an amount of gas or remainder that is too low.

In order to allow the data processing means 5, typically the microprocessor 15, to perform highly accurate calculations and to control rapid displaying by the display means, i.e. on the digital display 6, of the remainder available in the gas cylinder 1 equipped with the gas distribution valve 3 comprising the flow rate selector 12 based on a rotary member for selecting the outlet flow rate, the data processing means 5 are configured to calculate the remaining fluid.

Of course, calculating the remainder may require other parameters depending on the formula used and/or on the desired accuracy, such as the compressibility factor, etc. More generally, calculating a remainder on the basis of such parameters presents no difficulty. One example of calculating a remainder is given by WO2005/093377.

According to the invention, in order to provide the user with the remainder available in the container 1 with less fluctuation and more reliably, the data processing means 5, typically a circuit board with one or more microprocessors, are configured in a particular manner.

Thus, for an initial delay phase shorter than 10 minutes, for example for 3 to 5 minutes, which starts when the member for selecting the flow rate 12 is manipulated by the user in order to adjust the gas flow rate as desired by turning it clockwise or anticlockwise to move it from a first position corresponding to a first fluid flow rate, for example 0 L/Min, to a second position corresponding to a second fluid flow rate, for example 5 L/min, the data processing means 5 start by calculating a remainder on the basis of the position of the member for selecting the flow rate 12 which is detected by the one or more position sensors, of the measurements of the pressure and of the temperature of the gas, and of the internal volume 2 of the gas cylinder which is known and stored, for example, in a memory of the data processing means 5.

Next, the data processing means 5 control the displaying of the remainder (Ac) thus calculated on the display means 6, such as a digital screen, of the electronic device 7 fitted to the IPR of the gas cylinder.

Lastly, the data processing means 5 update, after a period of 1 minute, the displaying of the displayed remainder by displaying, on the display means 6, an updated remainder which is equal to the displayed remainder minus a duration of 1 minute.

These steps are repeated at time intervals of 30 seconds to 3 minutes, throughout the delay phase, so as to display updated remainders (Ar); for example, the update may take place every minute.

Additionally, the storage means make it possible to store a history comprising at least some and preferably all of the pressure and temperature measurements that have been taken by the means for measuring the pressure and temperature, i.e. one or more sensors.

This history is then used by the data processing means 5 to refine the determination of the remainder to be displayed. Thus, the data processing means 5 can calculate, after the initial delay phase, a remainder (Ac) calculated on the basis of the history of the measurements of the pressure and of the temperature of the gas, and of the internal volume 2 of the gas container 1 which is stored.

Next, according to this calculation, the data processing means 5 compare the remainder (Ac) thus calculated with the updated remainder (Ar) which was displayed on the display means 6, as explained above, and, according to this comparison, they then control displaying, on the display means 6, either of the updated remainder (Ar) when they determine that: $0.9.Ar \leq Ac \leq 1.1.Ar$, i.e. when Ac differs by less than +/−10% from Ar (expressed in %), or of the calculated remainder (Ac) when they determine that: $Ac<0.9.Ar$ or $Ac>1.1.Ar$, i.e. when Ac differs by more than +/−10% from Ar (expressed in %).

Of course, instead of a percentage (%), the difference (or threshold) could be expressed per unit time, typically in minutes, for example 30 minutes (or another preset threshold-duration). In this case, the display means 6 control displaying of the updated remainder (Ar) when they determine that Ac differs by less than +/−30 min from Ar, or of the calculated remainder (Ac) when they determine that Ac differs by more than +/−30 min from Ar.

The displaying of the remainder is then updated cyclically after an updating period of between 30 seconds and 3 minutes, which is chosen according to the difference between the calculated remainder (Ac) and the updated remainder (Ar).

Thus, the duration of the updating period is of the order of 1 minute when the calculated remainder (Ac) is displayed on the display means 6, and therefore when Ac differs by more than +/−30 min from Ar in the preceding example.

In any case, the data processing means 5 still display the calculated remainder (Ac) when the remainder is smaller than or equal to a preset safety threshold, preferably a safety threshold shorter than or equal to 30 minutes.

In other words, below a remaining gas safety threshold, for example 30 min, in the case of the calculated remainder being smaller than the measured remainder, for safety, the displayed remainder should always be updated so as to avoid overestimating what is displayed to the user.

Figure 3:
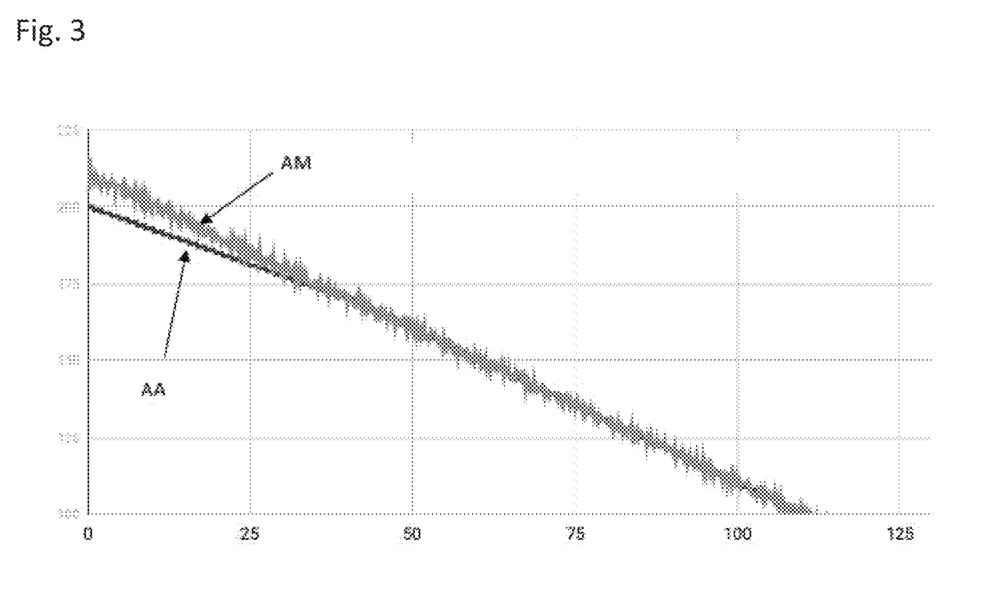
FIG. 3 is an example of a remainder measured and displayed over time when drawing gas from a gas container.
Figure 4:
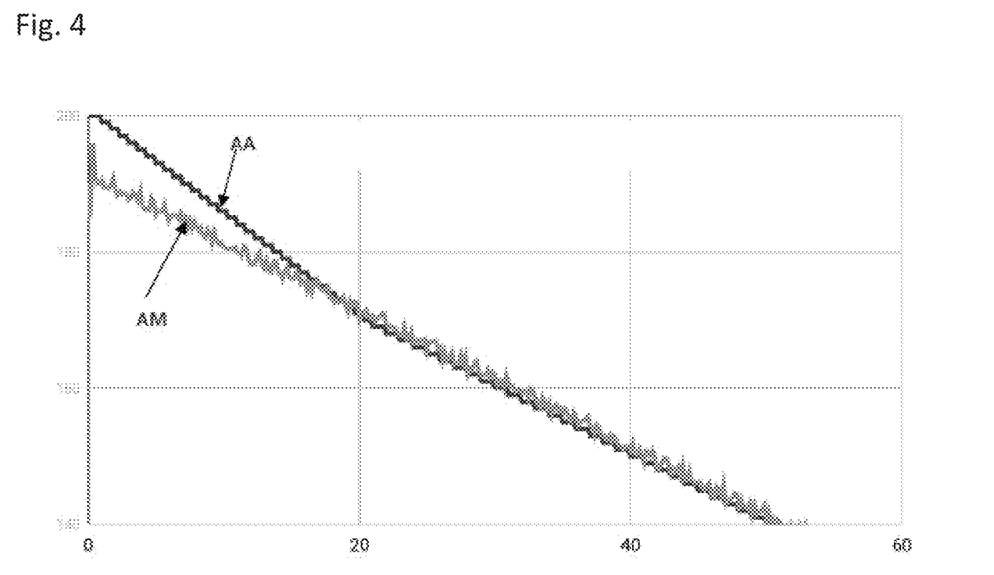
FIG. 4 is an example of a remainder measured and displayed over time when drawing gas from a gas container.
Figure 5:
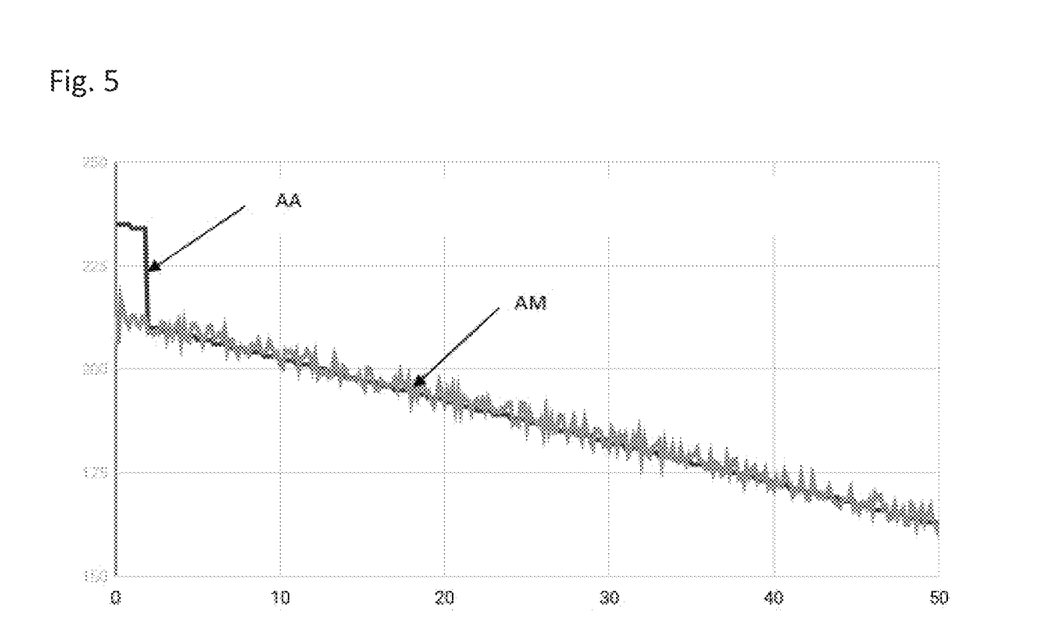
FIG. 5 is an example of a remainder measured and displayed over time when drawing gas from a gas container.

FIG. 3 to FIG. 5 are representations of the measured (AM) and displayed (AA) remainders during a decrease in gas pressure within a gas cylinder corresponding to the use of this gas cylinder over time, i.e. during withdrawal of the gas, in three different situations. The Y-axis gives the available remainder (expressed in minutes), while the X-axis gives elapsing time (expressed in minutes).

In FIG. 3, it can be seen that the curve AA, representing the remainder obtained by calculating (AA) on the basis of the position of the knob, of the measured pressure and of the cylinder volume, gives a remainder of 200 minutes at the start of use of the gas cylinder, i.e. a displayed remainder (AA) of 200 minutes. Next, this remainder decreases "linearly" minute by minute, i.e. the remainder is updated after 1 minute and the updated remainder that is displayed corresponds to the preceding remainder minus 1 minute, i.e. 199 minutes, then 198 minutes, etc.

Additionally, the first remainders calculated on the basis of the decrease in pressure result in a measured remainder (AM) of the order of 210 minutes, thus greater than the displayed remainder (AA), while still remaining within an acceptable range, i.e. an error of less than 10%.

From there, the displayed minutes are "adjusted" to make them last a bit longer than a minute in order to make the displayed remainder (AA) converge towards the measured remainder (AM). This is what is seen here, for example for the 25 first minutes of use when the display decreases only by 19 minutes (i.e. 19 steps).

After about 30 minutes, the remainders AM, AA have converged and are correlated, since the remainder curves (AA, AM) merge with one another for the rest of the duration of use of the gas cylinder.

In FIG. 4, it can be seen, as above, that the curve AA, representing the remainder obtained by calculating (AA) on the basis of the position of the knob, of the measured pressure and of the cylinder volume, gives a remainder of 200 minutes at the start of use of the gas cylinder, i.e. a displayed remainder (AA) of 200 minutes, which then decreases minute by minute throughout.

In parallel, the first remainders calculated for the observed decrease in pressure give a calculated remainder (curve AM) of the order of only 190 minutes, thus less than the displayed remainder (curve AA), while here too still remaining within an acceptable range with an error of less than 10%.

In this case, in contrast to the preceding case, the displayed minutes will last a bit less than a minute in order to make the displayed remainder (AA) converge towards the measured remainder (AA). This is what is seen throughout, for example for the 20 first minutes of use when the display decreases by 29 minutes (i.e. 29 steps). After about 20 minutes, the remainders are again correlated and the curves AA and AM merge thereafter.

Additionally, in FIG. 5, it can be seen that the curve AA, representing the remainder obtained by calculating (AA) on the basis of the position of the knob, of the measured pressure and of the cylinder volume, gives a remainder of 235 minutes, i.e. a displayed remainder (AA) of 235 minutes. This remainder then decreases minute by minute at the start, i.e. the time to have a reliable calculation based on the decrease in the pressure, namely here a few minutes (until the break in the curve AA).

In parallel, the first remainders calculated with the decrease in pressure give a remainder of the order of 210 minutes. This remainder is less than the displayed remainder and is not within an acceptable range, i.e. the error is more than 10%. The displayed minutes, i.e. the displayed remainder, will therefore be adjusted directly in order to converge immediately towards the measured/calculated remainder AM at the sudden drop on the curve AA. The remainders AA and AM are correlated and the curves merge thereafter.

These three examples illustrate the advantage in proceeding according to the invention in order to obtain reliable and relatively accurate displaying of the remaining gas in a gas cylinder or the like since they show that at the start of withdrawal, i.e. use of the gas, it is acceptable to display the calculated remainder (Ac) on the display means 6 and then to update, after a given period, for example of 1 minute, i.e. every minute, the displaying of the displayed remainder by displaying an updated remainder equal to the previously displayed remainder minus the given duration, for example 1 minute, and to repeat this procedure, throughout the initial delay phase, to display an updated remainder (Ar) after a given time interval, typically of between 30 seconds and 3 minutes, for example every minute. The initial delay phase preferably lasts less than 10 minutes.

Next, after the initial delay phase, the remainder, i.e. the calculated remainder (Ac), is calculated on the basis of the pressure measurements that were taken during the first few minutes of use and of the stored measurements of the temperature of the gas, and of the internal volume 2 of the fluid container, and either the updated remainder (Ar), if it does not differ by more than +/−10% from the calculated remainder (Ac) (see FIG. 3 and FIG. 4), or the calculated remainder Ac if it differs by more than +/−10% (see FIG. 5), is displayed on the display means 6.

A fluid container according to the invention is particularly well suited for storing and distributing a pressurized medical gas, typically medical oxygen.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A container for pressurized fluid having a given internal volume, comprising a fluid distribution valve comprising:
   a member for selecting the flow rate, which can be manipulated by a user between a plurality of distinct positions, each corresponding to a given fluid flow rate, and an electronic device comprising:
      a means for measuring pressure and temperature in order to measure the pressure and the temperature of the fluid contained in the fluid container,
      a processing means comprising at least one microprocessor which are configured to calculate a remaining fluid based the pressure and/or temperature measurements, of the position of the member for selecting the flow rate and of the internal volume of the container,
      and a display means for displaying the remaining fluid calculated by the data processing means,
   wherein:
   the data processing means are configured to:
   A) for an initial delay phase shorter than 10 minutes, starting when the member for selecting the flow rate is manipulated by the user in order to move from a first position corresponding to a first fluid flow rate to a second position corresponding to a second fluid flow rate:

i) calculate a remaining fluid based on the position of the member for selecting the flow rate, the measurements of the pressure and temperature of the gas, and the internal volume of the fluid container, and ii) display a calculated remaining fluid by controlling displaying, on the display means, of a calculated remaining fluid equal to the displayed remaining fluid minus an amount of fluid that is lost during a 1 minute duration, and B) repeat step A) iii) throughout the initial delay phase, to display an updated remaining fluid (Ar) after a time interval of between 30 seconds and 3 minutes throughout said initial delay phase.

2. The container according to claim 1, wherein, in step B), the updated remaining fluid is updated and displayed at time intervals of 1 minute.

3. The container according to claim 1, further comprising a storage means for storing at least one history comprising the pressure and temperature measurements taken by the means for measuring pressure and temperature.

4. The container according to claim 3, wherein the data processing means are further configured to:

C) calculate, after the initial delay phase, at least one remaining fluid calculated based on the history of the stored measurements of the pressure and temperature of the gas, and of the internal volume of the fluid container.

5. The container according to claim 4, wherein the data processing means are further configured to:

D) compare the calculated remaining fluid with the displayed remaining fluid displayed on the display means in step B) and E) control displaying, on the display means, of:
   i. the updated calculated remaining fluid when: $0.9\ Ar \leq Ac < 1.1\ Ar$, or
   ii. the calculated remaining fluid when: $Ac < 0.9\ Ar$ or $Ac > 1.1\ Ar$.

6. The container according to claim 5, wherein the data processing means are further configured to repeat steps C), D) and E) so as to display a remaining fluid after an updating period of between 30 seconds and 3 minutes.

7. The container according to claim 6, wherein the data processing means are further configured to set the duration of the updating period according to the difference between the calculated remaining fluid and the displayed remaining fluid.

8. The container according to claim 6, wherein the duration of the updating period is of the order of 1 minute when, in step E) ii), the calculated remaining fluid is displayed on the display means.

9. The container according to claim 5, wherein the data processing means are configured to display the calculated remaining fluid when said data processing means determine, in step D), that the calculated remaining fluid and the displayed remaining fluid differ from one another by at least 10 minutes.

10. The container according to claim 5, wherein the data processing means are configured to display the calculated remaining fluid when the calculated remaining fluid is smaller than or equal to the displayed remaining fluid.

11. The container according to claim 1, wherein the member for selecting the flow rate is configured to adopt a plurality of distinct positions each corresponding to a given fluid flow rate between 0 and 30 L/min, said member for selecting the flow rate being able to be rotatably manipulated by a user in order to select the desired flow rate.

12. The container according to claim 1, wherein the one or more microprocessors are configured to process the one or more pressure and temperature measurements provided by the one or more pressure and temperature sensors.

* * * * *